United States Patent
Ninomiya et al.

(10) Patent No.: US 8,233,019 B2
(45) Date of Patent: Jul. 31, 2012

(54) THERMAL HEAD

(75) Inventors: Emi Ninomiya, Tokyo (JP); Hiroshi Yamada, Tokyo (JP); Katsuhiko Igarashi, Tokyo (JP)

(73) Assignee: TDK Corporation, Chuo-ku, Tokyo (JP)

( * ) Notice: Subject to any disclaimer, the term of this patent is extended or adjusted under 35 U.S.C. 154(b) by 401 days.

(21) Appl. No.: 12/648,482

(22) Filed: Dec. 29, 2009

(65) Prior Publication Data

US 2010/0177154 A1   Jul. 15, 2010

(30) Foreign Application Priority Data

Jan. 9, 2009   (JP) ................ P2009-003841

(51) Int. Cl.
  *B41J 2/335*   (2006.01)
(52) U.S. Cl. ....................... 347/208; 347/202
(58) Field of Classification Search .......... 347/208, 347/200, 202, 204–206, 209, 197
See application file for complete search history.

(56) References Cited

U.S. PATENT DOCUMENTS

| 5,072,236 | A | * | 12/1991 | Tatsumi et al. | 347/203 |
| 5,245,356 | A | * | 9/1993 | Ota et al. | 347/197 |
| 5,485,192 | A | * | 1/1996 | Nagahata et al. | 347/203 |
| 6,469,724 | B1 | * | 10/2002 | Hayashi et al. | 347/204 |

FOREIGN PATENT DOCUMENTS

| JP | H2-303854 | 12/1990 |
| JP | 7-125277 | 5/1995 |
| JP | 10-71737 | 3/1998 |

* cited by examiner

*Primary Examiner* — Kristal Feggins
(74) *Attorney, Agent, or Firm* — Drinker Biddle & Reath LLP

(57) ABSTRACT

To provide a thermal head which provides an excellent adhesion between the common electrode and the heat element, and in which the content of Pb is sufficiently reduced. A thermal head 5, comprising a substrate 7, a glaze layer 3 provided on the substrate 7, a common electrode 4 provided on the glaze layer 3, a heat element 1 provided on the common electrode 4 and the glaze layer 3, and lead electrodes 2a and 2b provided on the heat element 1, wherein the common electrode 4 includes an electrically conductive material composed of metal and a glass frit, and the glass frit contains 15 to 35% by mass of ZnO, 14 to 34% by mass of $SiO_2$, 2 to 25% by mass of $Al_2O_3$, 2 to 15% by mass of $TiO_2$, 5 to 25% by mass of CaO, and 7 to 27% by mass of BaO.

6 Claims, 3 Drawing Sheets

THERMAL HEAD

BACKGROUND OF THE INVENTION

1. Field of the Invention

The present invention relates to a thermal head.

2. Related Background Art

A thermal head is used for thermosensitive recording of photographic printers such as rewrite printers, card printers, video printers, bar code printers, label printers, facsimiles, ticket-vending machines.

This type of thermal head performs printing on a medium and eliminates printed information by heating a printing part to a predetermined temperature. Specifically, a thermal head selectively applies voltage to a single or multiple heat elements, which are linearly arranged, to cause them to generate heat and, with the resulting heat energy, prints characters and pictures on a heat-responsive medium, or erases printed items thereon.

Japanese Patent Application Laid-Open No. 10-71737 discloses a thermal head in which an electric conductor and a heat element are formed in this order on a ceramics substrate such as alumina. Moreover, Japanese Patent Application Laid-Open No. 7-125277 discloses a thermal head in which an electrically conductive material is formed on a heat element.

Further, Japanese Patent Application Laid-Open No. 10-71737 and Japanese Patent Application Laid-Open No. 7-125277 disclose a silver electrode containing a glass component as an electric conductor provided in a thermal head. As a method of forming the common electrode and lead electrode of such thermal head, a screen printing method, an electrolytic plating method, and a method of patterning by photolithography are used.

SUMMARY OF THE INVENTION

Among the above described methods of forming the common electrode and lead electrode, the screen printing method is preferable in the aspect of cost. However, when an electrode is formed by a screen printing method using an electric conductor described in Japanese Patent Application Laid-Open No. 10-71737 and Japanese Patent Application Laid-Open No. 7-125277, it is found that the adhesion between the common electrode and the heat element is not sufficient, and a peeling is likely to occur between the common electrode and the heat element.

Further, since the electrode described in Japanese Patent Laid-Open No. 10-71737 contains PbO as a glass component, it is difficult to make it compatible to environment-caring Pb free products in recent years.

Accordingly, it is an object of the present invention to provide a thermal head which provides an excellent adhesion between the common electrode and the heat element, and in which the content of Pb is sufficiently reduced.

The thermal head of the present invention is a thermal head comprising: a substrate; a glaze layer provided on the substrate; a common electrode provided on the glaze layer; a heat element provided on the common electrode and the glaze layer; and a lead electrode provided on the heat element, wherein the common electrode includes an electrically conductive material composed of metal and a glass fit, and the glass frit contains 15 to 35% by mass of ZnO, 14 to 34% by mass of $SiO_2$, 2 to 25% by mass of $Al_2O_3$, 2 to 15% by mass of $TiO_2$, 5 to 25% by mass of CaO, and 7 to 27% by mass of BaO.

According to the thermal head of the present invention, since the glass fit, which is included in the common electrode, contains the above described specific amount of the above described metal oxides, a precipitation of a glass component originated from the common electrode to the interface between the heat element and the common electrode will be restricted. Therefore, a peeling between the common electrode and the heat element, which is considered to be caused by a precipitation of glass component, is restricted and it is possible to obtain a thermal head which provides a good adhesion between the common electrode and the heat element. Further, the thermal head of the present invention has a glaze layer provided on the substrate. When the common electrode is laminated onto the glaze layer, it is considered as follows: among the glass components of the glaze layer, the same component as the specific component contained in the common electrode is diffused to the surface of the common electrode through thermal diffusion etc. to enter into the network structure of glass made up of $SiO_2$ and $Al_2O_3$, thereby resulting in a reaction in which the mesh of glass is expanded and the network structure is softened; and therefore, the adhesion between the common electrode and the glaze layer is improved. Moreover, since the thermal head of the present invention does not contain Pb as an essential component of the common electrode, it becomes possible to provide a product in which the content of Pb is sufficiently reduced. Note that, the reason why the effects of the present invention are achieved is not limited to the above described one.

Further, the glass frit relating to the thermal head of the present invention preferably contains 20 to 30% by mass of ZnO, 19 to 29% by mass of $SiO_2$, 7 to 17% by mass of $Al_2O_3$, 5 to 10% by mass of $TiO_2$, 10 to 20% by mass of CaO, and 12 to 22% by mass of BaO.

When the common electrode contains the above described specific amounts of the above described specific metal oxides, it is possible to obtain a thermal head which provides a particularly excellent adhesion between the common electrode and the heat element.

Further, the electrically conductive material relating to the thermal head of the present invention preferably contains at least one kind of metal selected from Ag, Pd, Au, Pt, Ni, Cu, and Al.

Further, the content of glass frit relating to the thermal head of the present invention is preferably 1 to 10% by mass with reference to the total amount of the electrically conductive material. When the content of glass fit exceeds 10% by mass, the electrical conductivity of the common electrode tends to decline, and when it is less than 1% by mass, there is the tendency that sufficient adhesion between the glaze layer and the common electrode is not obtained.

According to the present invention, it is possible to provide a thermal head which achieves a sufficiently good adhesion between the surface of the common electrode and the heat element, and in which the content of Pb is sufficiently reduced.

DESCRIPTION OF THE PREFERRED EMBODIMENTS

Hereafter, preferred embodiments of the thermal head of the present invention will be specifically described with reference to the drawings. However, the present invention will not be limited to the embodiments described below.

Figure 1:
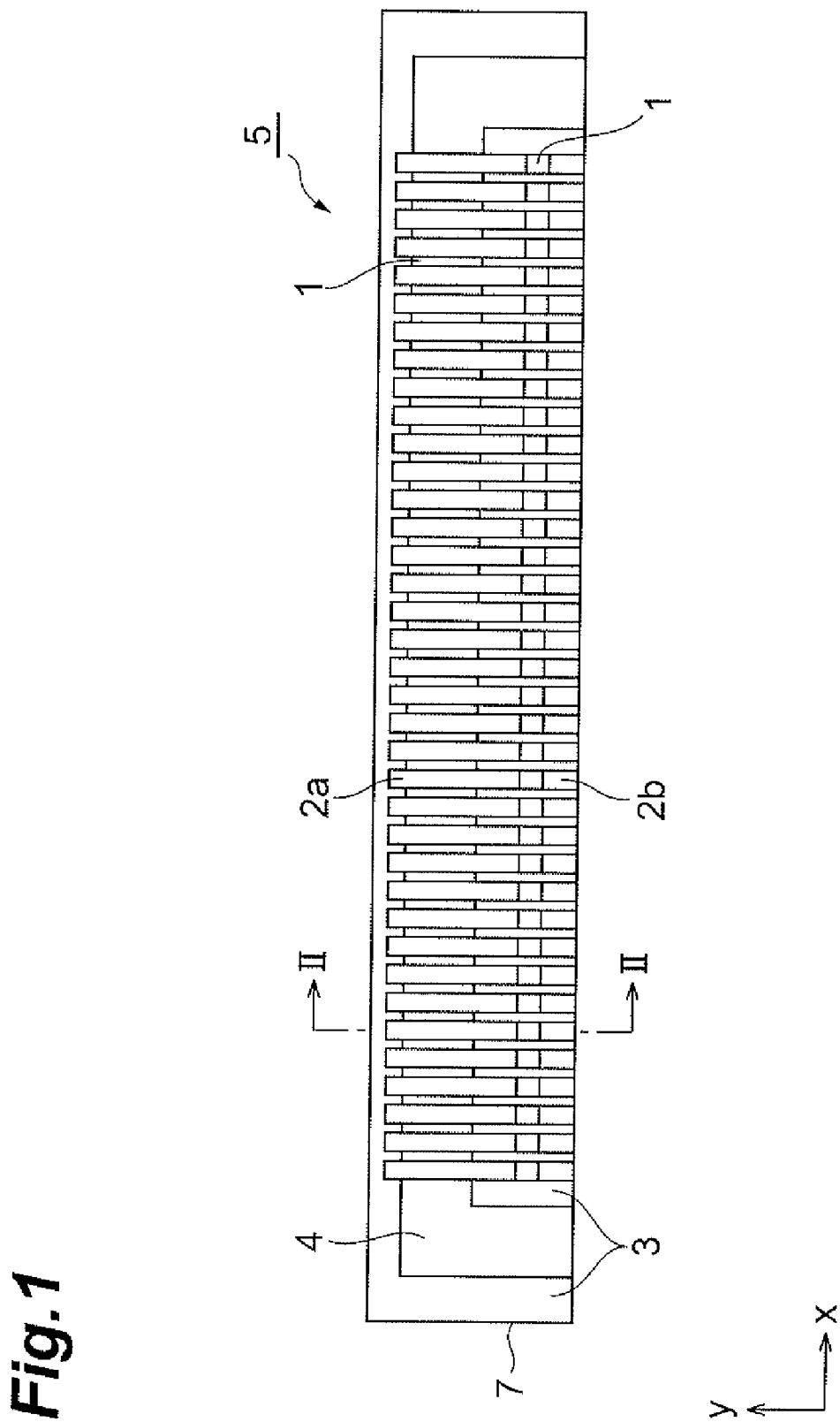
FIG. 1 is a top view of a thermal head relating to a preferred embodiment of the present invention.

FIG. 1 is a top view of a thermal head relating to a preferable embodiment of the present invention. The thermal head 5 of the present embodiment includes: as shown in FIG. 1, a common electrode 4 formed into a U-shape on a substrate 7 which is provided on its surface with a glaze layer 3; a heat element 1 of a comb shape having a main body which continuously covers the surface of the common electrode 4 in the lengthwise direction (x direction), and tooth portions which are provided on the glaze layer 3 so as to be arranged at an equal interval in the lengthwise direction (x direction) of the substrate 7 and are perpendicularly linked to the main body; and lead electrodes 2a and 2b which respectively cover both ends of the tooth portions of the heat element 1. The heat element 1 is specifically shaped such that the portion which continuously covers the surface of the common electrode 4 in the lengthwise direction (x direction) is a main body (the long side portion of the comb), and the portions which are provided on the glaze layer in multiple numbers so as to be arranged at an equal interval are the tooth portions. A part of each tooth portion of the heat element 1, which is provided so as to be arranged at an equal interval, is exposed from between the lead electrodes 2a and 2b.

Figure 2:
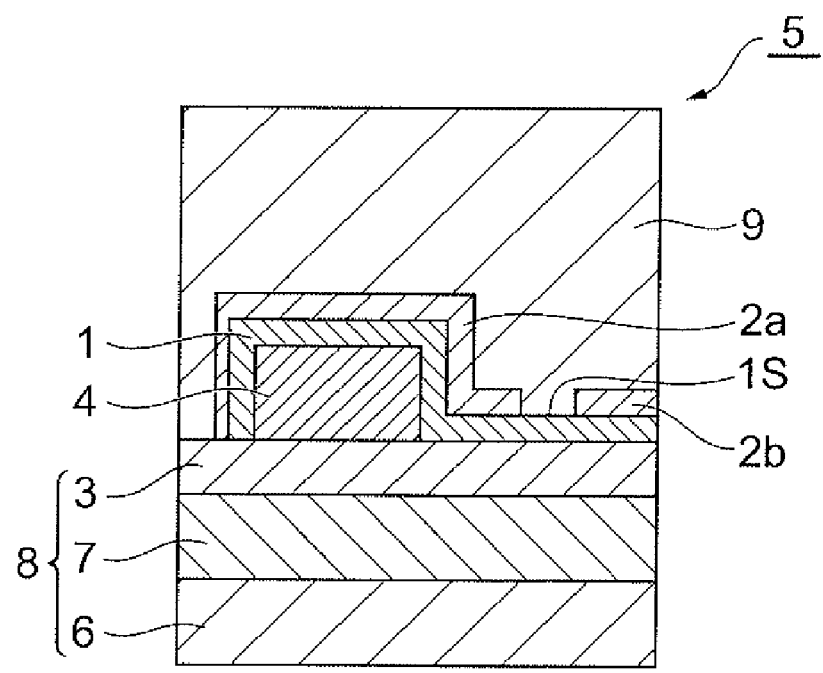
FIG. 2 is a schematic sectional view taken along line II-II of the thermal head of FIG. 1.

FIG. 2 is a schematic sectional view of the thermal head 5 taken along line II-II of FIG. 1. The thermal head 5 has a laminated structure as shown in FIG. 2. This laminated structure has a laminated portion 8 in which a mount 6, a substrate 7, and a glaze layer 3 are laminated in this order from the lower side. Moreover, a common electrode 4 is provided on the glaze layer 3 of the laminated portion 8, and a heat element 1 is provided so as to cover a part of the glaze layer 3 and the common electrode 4. Further, the lead electrodes 2a and 2b are provided so as to cover both ends of the heat element 1, in which the lead electrode 2a is provided above the common electrode 4. Further, the protection layer 9 is provided on the laminated portion 8 so as to cover the heat element 1 which is exposed between the lead electrode 2a and the lead electrode 2b, and the lead electrodes 2a and 2b. Hereafter, materials composing each member will be described in detail with reference to FIG. 2. Note that, the thermal head described here can be used either as a printing head or as a character-erasing head.

(Substrate and Glaze Layer)

The substrate 7 preferably contains ceramic having insulating properties, such as alumina base material. The glaze layer 3 of a predetermined thickness is provided on the surface of the substrate 7. The glaze layer 3 is formed, for example, by softening and firing glass, and functions as a heat storage layer. Further, the substrate 7 may be formed on a mount 6 which has a heat dissipating effect. Examples of the material of the mount 6 include aluminum, which has a good thermal conductivity. The mount 6 and the substrate 7 may be connected via a connection layer (not shown).

(Common Electrode and Heat Element)

The common electrode 4 is formed on the glaze layer 3. The common electrode 4 is also sometimes called as an auxiliary electrode in an ordinary thermal head. The common electrode 4 acts to effectively prevent a voltage drop in the lead electrode 2a when large current flows in the lead electrode 2a as described below.

The common electrode 4 used for the thermal head 5 of the present embodiment includes an electrically conductive material and a glass frit. The electrically conductive material preferably includes at least one kind of metal selected from Ag, Pd, Au, Pt, Ni, Cu, and Al, and more preferably includes Ag in the economical aspect. Further, the glass frit contains 15 to 35% by mass of ZnO, 14 to 34% by mass of $SiO_2$, 2 to 25% by mass of $Al_2O_3$, 2 to 15% by mass of $TiO_2$, 5 to 25% by mass of CaO, and 7 to 27% by mass of BaO.

The heat element 1 is formed on the laminated portion 8 so as to cover the common electrode 4 and a part of the surface of the glaze layer 3 described above. Examples of the heat element 1 include, for example, a resistor composed of a thin film of cermet materials such as $TaSiO_2$ and $NbSiO_2$, a polysilicon (Poly-Si) thin film, or a ruthenium oxide thin film. The heat element 1 may be formed by using a thin-film forming method such as a vacuum deposition method, a CVD (Chemical-Vapor Deposition) method, and a sputtering method, and a photoetching method, or by using a thick-film forming technology which involves screen printing and firing. The thickness of the heat element is preferably 0.03 to 30 μm.

When the glass frit contained in the common electrode 4 has the above described composition, the precipitation of glass from the common electrode 4 is restricted while the common electrode 4 is fabricated and the thermal head 5 is being used, and therefore it becomes possible to sufficiently maintain the adhesion between the common electrode 4 and the heat element 1. Note that, when the content of $Al_2O_3$ in the glass frit is less than the above described range, since glass softens while other members such as heat element are formed after the formation of the common electrode, the adhesion between the common electrode 4 and the heat element 1 becomes insufficient.

When the content of either of $SiO_2$ and $Al_2O_3$ in glass frit is out of the above described range, not only the adhesion between the common electrode 4 and the heat element 1 becomes insufficient, but also the adhesion between the common electrode 4 and the glaze layer 3 tends to be insufficient. Further, when the content of any of $TiO_2$, CaO, and BaO is out of the above described range, not only the adhesion between the common electrode 4 and the heat element 1 becomes insufficient, but also the adhesion between the common electrode 4 and the glaze layer 3 tends to be insufficient.

The composition of the glass fit preferably contains 20 to 30% by mass of ZnO, 19 to 29% by mass of $SiO_2$, 7 to 17% by mass of $Al_2O_3$, 5 to 10% by mass of $TiO_2$, 10 to 20% by mass of CaO, and 12 to 22% by mass of BaO. When the glass frit has the above described composition, the adhesion between the common electrode and the heat element will be improved.

The common electrode 4 has a structure in which glass frits are dispersed in a metal matrix. Specifically, a structure in which particulate metals (metallic particles) are bonded by glass frits (fragments of glass such as flakes or powders) is preferable. The glass frit melts during the fabrication of the common electrode to gain a binding property, and acts as a binding agent to joint metallic particles. The glass frit preferably used is a crystallized glass.

In the aspect of improving the packing property of the electrode material, preferably a metallic particle is used as the electrically conductive material, and more preferably the metallic particle has an average particle diameter of 0.01 to 10 μm. When the average particle diameter of metallic particle is less than 0.01 μm, there is strong tendency that the metallic particles reagglomerate, and thus the shrinkage ratio of the metallic particle increases. As a result of that, an interruption of electrically conductive material occurs, thereby leading to a decline in electrical conductivity. Further, when the average diameter of the metallic particle exceeds 10 there is tendency that the printability and dispersibility of the conductor paste deteriorate.

Note that, when the glass frit included in the common electrode 4 is particulate (glass particles), the glass particle preferably has a particle diameter of 0.1 to 30 µm, and more preferably has a scaly shape. Even when the shape is not scaly, the glass particle preferably has a particle diameter of 0.1 to 30 µm.

When the common electrode 4 is formed by a screen printing method, an electrically conductive paste, which includes the above described electrically conductive material and the glass frit, and a vehicle which is a mixture of a binder, a dispersant, a solvent and the like, is prepared. The vehicle is appropriately selected as needed from binders such as ethyl cellulose, nitrocellulose, and acrylic resin, solvents such as terpineol, butyl carbitol, butyl carbitol acetate, toluene, cyclohexane, and methyl ethyl ketone, as well as other agents such as dispersants, anti-setting agents, and activators.

The content of the vehicle in the conductor paste is preferably about 10 to 70% by mass. The conductor paste may be fabricated by mixing the above described electrically conductive material and glass frit, admixing thereto the above described binder and solvent, and other agents such as a dispersant, an anti-setting agent, and an activator appropriately selected as needed, and kneading the mixture to make a slurry. The common electrode 4 is obtained by printing and firing the above described conductor paste on the glaze layer 3 of the laminated portion 8 in a predetermined pattern. Note that screen printing may be performed once or repeated multiple times depending on the thickness of the electrode. The thickness of the common electrode 4 is 1 to 30 µm.

The content of glass frit in the fabricated common electrode 4 is preferably 1 to 10% by mass, more preferably 5 to 9% by mass, and most preferably 3 to 7% by mass with reference to the total amount of the electrically conductive material. When the content of glass fit exceeds 10% by mass, the electrical conductivity of the common electrode tends to deteriorate. Moreover, when it is less than 1% by mass, there is tendency that a sufficient adhesion with the glaze layer cannot be obtained.

Among the components contained in glass frit, a part of $TiO_2$, CaO, or BaO may be replaced by other metal oxides. Alternative components of $TiO_2$ may include, for example, ZnO and ZrO. Moreover, alternative components of CaO and BaO may include, for example, SrO.

(Lead Electrode 2a and 2b)

The lead electrode 2a is electrically connected to the common electrode 4 via the heat element 1. As described above, the lead electrode 2a is provided so as to cover a part of the heat element 1 provided on the common electrode 4, to prevent a voltage drop in the lead electrode 2a when a large current passes therethrough. On the other hand, the lead electrode 2b, which is provided so as to have a predetermined spacing from the lead electrode 2a and to cover the other part of the heat element 1, is connected to an IC chip (not shown) for performing the control of the voltage to be applied to the heat element 1 in a common thermal head.

The lead electrodes 2a and 2b are composed of, for example, aluminum. The lead electrode is formed by a thin-film forming method such as sputtering, and a photoetching method. Note that the thickness of the lead electrodes 2a and 2b are, though not specifically limited to, 0.05 to 2 µm.

(Protection Layer)

The thermal head 5 has a protection layer 9 of a thickness of about 3 to 30 µm as the uppermost layer. The protection layer 9 is formed into a film so as to cover the heat element 1, the lead electrodes 2a and 2b, and the glaze layer 3, and others. Examples of the material to compose the protection layer 9 may include $SiO_2$, SiON, SiAlO, SiBP, and the like. These protection layers are formed by a vapor deposition method, a sputtering method, a plasma CVD method, or the like.

In the thermal head 5 of the present embodiment, the heat element 1 is to be heated by being connected with the lead electrodes 2a and 2b, and applied with a voltage. As shown in FIG. 2, a part of the surface of the protection layer 9, which is located just above the surface 1S of the heat element 1 and not covered with the lead electrodes 2a and 2b, functions as a printing and erasing head.

The above described thermal head can be used in, for example, a barcode label printer, a printer for ticket-vending machine, a prepaid card printer, a video printer, and the like.

According to the thermal head of the present embodiment including the above described common electrode, it is possible to prevent a peeling between the common electrode and the heat element during the formation of the heat element and the use of the thermal head, and thereby to achieve a long-life thermal head. Further, since the common electrode does not contain Pb as an essential component, it is possible to make an environment-caring thermal head with a reduced Pb content. That is, by specifying the composition of the glass frit in the common electrode to be a value within the range of the present embodiment, it becomes possible to achieve a thermal head which provides a sufficiently good adhesion between the common electrode and the heat element even if the common electrode does not contain Pb at all.

Next, the present invention will be described in further detail by showing specific examples. Note that the present invention will not be limited to the following examples.

Examples 1 to 13 and Comparative Examples 1 to 12

Preparation of Electrically Conductive Paste Composition

Ag particles, glass particles (glass frits), a binder and a dispersant were kneaded to prepare an electrically conductive paste composition. The average particle diameter of the Ag particle was 0.5 µm, and the average particle diameter of the glass particle was 2 µm. As the binder, an ethyl cellulose based resin dissolved in terpineol by a concentration of 15% by mass was used.

The content of the Ag particle in the resulting electrically conductive paste composition was 70% by mass. Note that the loading of the binder was 20 to 40% by mass with reference to the total mass of the Ag particles. Further, the mixing ratio of the dispersant was determined such that its effective component concentration was 1% by mass with reference to the total mass of the Ag particle and the glass fit. The compositions of the glass particle and the content of the glass particle with reference to the total mass of the Ag particle used in Examples 1 to 13 and Comparative Examples 1 to 12 are shown in Table 1 below.

TABLE 1

| | | Compositions of glass particle (% by mass) | | | | | | Content of glass particle (% by mass) |
|---|---|---|---|---|---|---|---|---|
| | | ZnO | SiO$_2$ | Al$_2$O$_3$ | TiO$_2$ | CaO | BaO | |
| Examples | 1 | 18 | 32 | 11 | 4 | 24 | 11 | 4 |
| | 2 | 32 | 23 | 5 | 8 | 14 | 18 | 3 |
| | 3 | 26 | 17 | 21 | 3 | 18 | 15 | 4 |
| | 4 | 30 | 22 | 6 | 12 | 9 | 21 | 5 |
| | 5 | 34 | 16 | 12 | 9 | 21 | 8 | 5 |
| | 6 | 25 | 14 | 21 | 7 | 23 | 10 | 6 |
| | 7 | 31 | 24 | 3 | 14 | 8 | 20 | 6 |
| | 8 | 24 | 30 | 12 | 3 | 17 | 14 | 3 |
| | 9 | 25 | 15 | 23 | 8 | 7 | 22 | 5 |
| | 10 | 16 | 31 | 14 | 13 | 6 | 20 | 4 |
| | 11 | 17 | 26 | 22 | 2 | 16 | 17 | 7 |
| | 12 | 19 | 32 | 4 | 11 | 25 | 9 | 4 |
| | 13 | 25 | 24 | 12 | 7 | 15 | 17 | 7 |
| Comparative Examples | 1 | 52* | 15 | 12 | 5 | 10 | 6 | 7 |
| | 2 | 3* | 25 | 18 | 12 | 23 | 19 | 7 |
| | 3 | 17 | 36* | 11 | 5 | 17 | 14 | 6 |
| | 4 | 26 | 12* | 17 | 7 | 17 | 21 | 5 |
| | 5 | 16 | 18 | 42* | 6 | 10 | 8 | 4 |
| | 6 | 35 | 22 | 1* | 11 | 15 | 16 | 6 |
| | 7 | 17 | 21 | 8 | 18* | 17 | 19 | 7 |
| | 8 | 26 | 19 | 20 | 0* | 19 | 16 | 6 |
| | 9 | 27 | 21 | 14 | 4 | 28* | 6 | 5 |
| | 10 | 25 | 21 | 18 | 17 | 3* | 16 | 4 |
| | 11 | 17 | 18 | 14 | 6 | 16 | 29* | 6 |
| | 12 | 21 | 24 | 21 | 13 | 18 | 3* | 5 |

Note that * is attached to the values of components which are out of the range of the composition specified in the present invention.

(Fabrication of Thermal Head)

Figure 3:
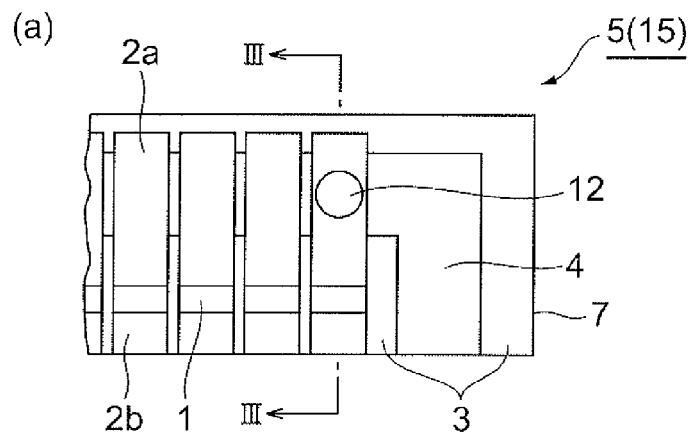
FIG. 3(a) is a top view of the thermal head during the measurement test of peel strength.
FIG. 3(b) is s schematic sectional view taken along line of the thermal head of FIG. 3(a) relating to an example of the aforementioned test.
FIG. 3(c) is a schematic sectional view taken along line of the thermal head of FIG. 3(a) relating to another example of the aforementioned test.
Figure 3:
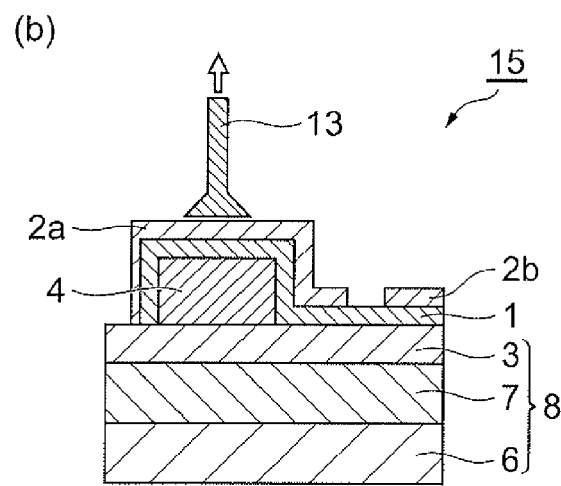
Figure 3:
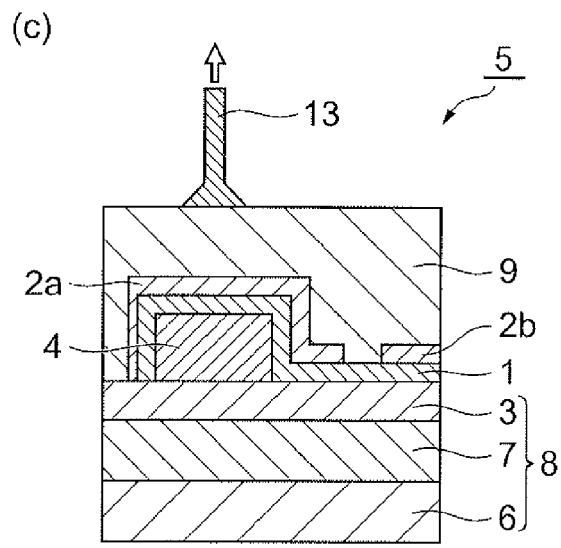

FIG. 3 is an explanatory diagram to schematically show the structure of the thermal heads of Examples 1 to 13 and Comparative Examples 1 to 12, and the evaluation method thereof. FIG. 3(a) is a top view of the thermal head during a peel strength measurement test, FIG. 3(b) is a schematic sectional view taken along line III-III of the thermal head of FIG. 3(a) relating to an example of the aforementioned test, and FIG. 3(c) is a schematic sectional view taken along line III-III of the thermal head of FIG. 3(a) relating to another example of the aforementioned test.

As shown in FIGS. 3(a) and 3(b), an alumina substrate 7, which was formed on its surface with a glaze layer 3, was prepared. On the alumina substrate 7, an electrically conductive paste composition, which was prepared as described above, was printed by a screen printing method and, after being dried, was fired in the atmosphere at 750 to 850° C. to form a common electrode 4.

Next, a heat element 1 was formed on the surfaces of the common electrode 4 and the glaze layer 3, and further lead electrodes 2a and 2b were formed at both ends of the heat element 1 to fabricate a first substrate 15, thereafter conducting the below described Test 1 as described in FIGS. 3(a) and 3(b) on a first substrate 15 obtained. Further, a protection layer 9 was formed as shown in FIG. 3(c) to obtain a second substrate, that is, a thermal head 5. The resulting thermal head 5 was subjected to the below described Test 2 as shown in FIGS. 3(a) and 3(c).

(Test 1)

First, for the first substrate 15, a stud pin was fixedly attached to a stud-pin fixing portion 12 shown in FIG. 3(a). Specifically, as shown in FIG. 3(b), a stud pin 13 was fixedly attached to the surface of the lead electrode 2a with an adhesive so as to be perpendicular to the first substrate 15. Then, the stud pin 13 was pulled toward the arrow direction in the figure by use of a tensile test machine, and a load at which a peeling occurs between the common electrode 4 and the heat element 1 was measured. The result of thus measured peel strength (N/cm$^2$) is shown in Table 2.

(Test 2)

Further, a protection layer 9 was formed on the first substrate 15 and, after the thermal head 5 was obtained, a stud pin was fixedly attached to the stud-pin fixing portion 12 shown in FIG. 3(a) as with Test 1. Specifically, as shown in FIG. 3(c), a stud pin 13 was fixedly attached to the surface of the protection layer 9 using an adhesive so as to be perpendicular to the thermal head 5. Then, the stud pin 13 was pulled toward the arrow direction in the figure by a tensile testing machine and a load at which a peeling occurred between the common electrode 4 and the heat element 1 was measured. The result of peel strengths (N/cm$^2$) thus measured is shown in Table 2. Note that tensile speed of the above described tensile testing machine used in Tests 1 and 2 was 5 mm/min.

TABLE 2

| | | Peel strength (N/cm$^2$) | |
|---|---|---|---|
| | | Test 1 | Test 2 |
| Examples | 1 | 143 | 140 |
| | 2 | 134 | 128 |
| | 3 | 141 | 138 |
| | 4 | 135 | 98 |
| | 5 | 128 | 95 |
| | 6 | 132 | 130 |
| | 7 | 135 | 129 |
| | 8 | 116 | 86 |
| | 9 | 142 | 137 |
| | 10 | 121 | 81 |
| | 11 | 145 | 134 |
| | 12 | 132 | 87 |
| | 13 | 177 | 175 |
| Comparative Examples | 1 | 88 | 81 |
| | 2 | 79 | 72 |
| | 3 | 72 | 67 |
| | 4 | 52 | 21 |
| | 5 | 49 | 24 |
| | 6 | 81 | 72 |
| | 7 | 76 | 69 |
| | 8 | 60 | 23 |
| | 9 | 73 | 59 |
| | 10 | 45 | 19 |
| | 11 | 76 | 62 |
| | 12 | 55 | 22 |

In Examples 1 to 13, sufficient strengths were obtained between the common electrode 4 and the heat element 1. In particular, in Example 13, a peel strength not less than 170 N/cm$^2$ was obtained for both Tests 1 and 2. On the other hand, in the common electrodes of Comparative Examples 1 to 12, in which the content of the components of glass particles was out of the range specified in the present invention, a sufficient peel strength was not obtained.

Therefore, according to the present invention, it is possible to provide a thermal head which has a sufficiently high adhesion between the common electrode and the heat element and in which the content of Pb is sufficiently reduced.

What is claimed is:
1. A thermal head, comprising:
   a substrate;
   a glaze layer provided on the substrate;
   a common electrode provided on the glaze layer;
   a heat element provided on the common electrode and the glaze layer; and
   a lead electrode provided on the heat element, wherein the common electrode includes an electrically conductive material composed of metal and a glass frit, and the glass frit contains 15 to 35% by mass of ZnO, 14 to 34% by mass of $SiO_2$, 2 to 25% by mass of $Al_2O_3$, 2 to 15% by mass of $TiO_2$, 5 to 25% by mass of CaO, and 7 to 27% by mass of BaO.

2. The thermal head according to claim 1, wherein the glass fit contains 20 to 30% by mass of ZnO, 19 to 29% by mass of $SiO_2$, 7 to 17% by mass of $Al_2O_3$, 5 to 10% by mass of $TiO_2$, 10 to 20% by mass of CaO, and 12 to 22% by mass of BaO.

3. The thermal head according to claim 1, wherein the electrically conductive material contains at least one kind of metal selected from Ag, Pd, Au, Pt, Ni, Cu, and Al.

4. The thermal head according to claim 1, wherein the content of glass frit in the common electrode is 1 to 10% by mass with reference to the total amount of the electrically conductive material.

5. The thermal head according to claim 2, wherein the content of glass frit in the common electrode is 1 to 10% by mass with reference to the total amount of the electrically conductive material.

6. The thermal head according to claim 3, wherein the content of glass frit in the common electrode is 1 to 10% by mass with reference to the total amount of the electrically conductive material.

* * * * *